United States Patent [19]

Tanaka et al.

[11] Patent Number: 5,700,432
[45] Date of Patent: Dec. 23, 1997

[54] FLUIDIZED-BED REACTOR AND A TEMPERATURE-CONTROLLING METHOD FOR THE FLUIDIZED-BED REACTOR

[75] Inventors: Minoru Tanaka; Chi Wai Hui, both of Kurashiki, Japan

[73] Assignee: Mitsubishi Chemical Corporation, Tokyo, Japan

[21] Appl. No.: 532,649

[22] PCT Filed: Feb. 7, 1995

[86] PCT No.: PCT/JP95/00163

§ 371 Date: Dec. 15, 1995

§ 102(e) Date: Dec. 15, 1995

[87] PCT Pub. No.: WO95/21692

PCT Pub. Date: Aug. 17, 1995

[30] Foreign Application Priority Data

Feb. 8, 1994 [JP] Japan ................... 6-014336
May 10, 1994 [JP] Japan ................... 6-096319

[51] Int. Cl.[6] .................................................. F27B 15/14
[52] U.S. Cl. .................... 422/146; 422/109; 422/198; 422/200; 165/104.16
[58] Field of Search .................. 422/146, 109, 422/198, 200; 165/210, 253, 287, 104.13, 104.14, 104.16, 172

[56] References Cited

U.S. PATENT DOCUMENTS 2,697,334  12/1954  Clarke .
2,755,782   7/1956  Campbell et al. .
3,825,501   7/1974  Muenger ........................... 422/146
4,258,006   3/1981  Flockenhaus et al. ............. 422/146
4,343,634   8/1982  Davis .
4,563,267   1/1986  Graham et al. .
5,380,497   1/1995  Ivanov et al. ..................... 422/142

FOREIGN PATENT DOCUMENTS 0 534 243 A1   3/1993  European Pat. Off. .
2034019       12/1970  France .

OTHER PUBLICATIONS

Supplementary European Search Report dated Jun. 4, 1996.
Process Heat Transfer By Donald Q. Kern, McGraw-Hill Book Company, Inc., New York, 1950, Chapters 3, 6, 7, 8, 19 and 20.

*Primary Examiner*—Christopher Kim
*Attorney, Agent, or Firm*—McAulay Fisher Nissen Goldberg & Kiel, LLP

[57] ABSTRACT

A fluidized-bed reactor has a plurality of heat-removing pipes and at least one temperature detection section disposed in a fluidized-bed forming portion. The heat-removing pipes are connected with coolant-feeding pipes and coolant-draining pipes at the outside of the reactor at least one of the heat-removing pipes is supplied with a first coolant at a stationary velocity and at least one of the other heat-removing pipes is supplied with a second coolant at a variable velocity. A temperature controlling method is disclosed for a fluidized-bed reactor in which heat is removed by using these heat-removing pipes in the fluidized-bed reactor.

11 Claims, 3 Drawing Sheets

FLUIDIZED-BED REACTOR AND A TEMPERATURE-CONTROLLING METHOD FOR THE FLUIDIZED-BED REACTOR

FIELD OF THE INVENTION

The present invention relates to a fluidized-bed reactor suitable for supporting exothermic gas-phase reaction and capable of easily controlling the reaction temperature, as well as a temperature-controlling method for the fluidized-bed reactor. More particularly, the present invention relates to a fluidized-bed reactor used for carrying out an exothermic gas-phase reaction, for example, an oxidative reaction of a hydrocarbon compound by a large-scaled fluidized-bed reactor in an industrial scale, as well as a method of controlling the reaction temperature for a fluidized-bed.

BACKGROUND OF THE INVENTION

Reaction temperature in a fluidized-bed reactor of an industrial scale has generally been controlled by disposing a heat removing pipe in a fluidized-bed and flowing water through the pipe for recovering reaction heat as steam (refer to U.S. Pat. No. 3,156,538). Further, it has also been attempted to dispose heat-removing pipes separately in an upper portion and a lower portion of the fluidized-bed so as to control the temperature in the upper portion and the lower portion of the fluidized-bed separately (refer to U.S. Pat. No. 3,080,382). Further, in addition to the indirect heat removal by coolants, there has also been known a method of finely controlling the temperature of a fluidized-bed by adjusting the temperature of a reaction material supplied to a reactor, or a method of finely controlling the temperature of a fluidized-bed by increasing or decreasing the amount of generated heat by adjusting the feeding rate of the reaction material.

Generally, reaction performance and catalyst life of a catalyst used in a fluidized-bed reactor are often influenced greatly depending on working conditions. Also, it is necessary to keep the fluidized-bed in a satisfactory fluidizing condition. It is known that the fluidizing condition is greatly influenced by the gas-flowing rate and the particle size of the catalyst. Accordingly, it is preferable that the composition and the feeding rate of the reaction material are kept constant as much as possible.

However, even if the composition, the temperature and the feeding rate of the reaction material are controlled constant, the temperature of the fluidized-bed changes inevitably. Particularly, in a large-scale fluidized-bed reactor for industrial use having a diameter of not less than 0.5 m, it is extremely difficult to control the reaction temperature rapidly and accurately. Therefore, the reaction temperature rises excessively to degrade the catalyst, or in an extreme case, even detrimentally affects safe operation.

That is, even if the temperature fluctuation at the inside of the fluidized-bed is reduced by maintaining the factors which may be considered to give influence on the temperature of the fluidized-bed such as feed temperature, moisture, composition and feeding rate of the reaction material, as constant as possible, the temperature of the fluidized-bed still changes inevitably. Accordingly, for the catalyst to attain the highest reaction performance, it is indispensable to positively control and maintain the temperature of the fluidized-bed to an optimum temperature.

An object of the present invention is to provide a fluidized-bed reactor capable of rapidly corresponding with even a minute temperature change of the fluidized-bed, as well as a method of controlling the reaction temperature of the fluidized-bed reactor rapidly and accurately.

DISCLOSURE OF THE INVENTION

In accordance with a first aspect of the present invention, there is provided a fluidized-bed reactor capable of easily maintaining the temperature of the fluidized-bed to an optimum temperature, wherein a plurality of heat-removing pipes and at least one temperature detection section are disposed in a fluidized-bed forming portion. The heat-removing pipes are connected with coolant-feeding pipes and coolant-draining pipes at the outside of the reactor, and at least one of the heat-removing pipes comprises a heat-removing pipe supplied with coolants at a stationary (constant) rate (the stationary heat-removing pipe) and at least one of the other heat-removing pipes comprises a heat-removing pipe supplied with a second coolant at a variable rate (the adjustable heat-removing pipe).

In accordance with a second aspect of the present invention, there is provided a temperature-controlling method of controlling the reaction temperature of a fluidized-bed reactor rapidly and accurately upon carrying out an exothermic gas-phase reaction in a fluidized-bed reactor, which comprises using a reactor in which a plurality of the heat-removing pipes are disposed in a fluidized-bed, and removing heat by supplying coolant at a stationary (constant) feeding rate to at least one of the heat-removing pipes and supplying coolants at a variable feeding rate to at least one of the other heat-removing pipes.

BEST MODE FOR PRACTICING THE INVENTION

Figure 1:
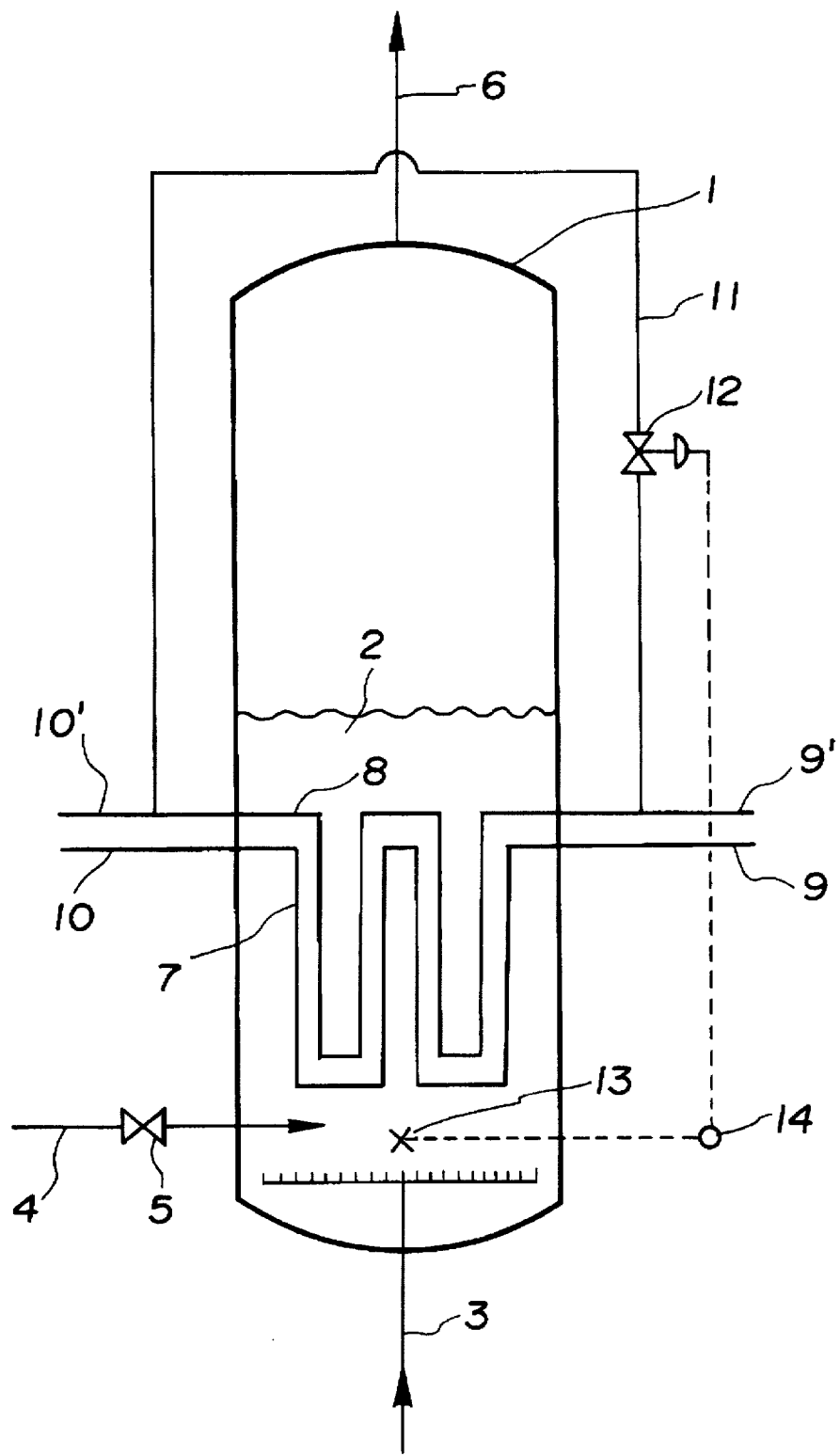
FIG. 1 is a conceptional view for an example of a fluidized-bed reactor practicing the present invention.

Referring more specifically to the present invention, it is necessary that the temperature fluctuation at the inside of the fluidized-bed is reduced and the change with time of the temperature is made as small as possible for carrying out exothermic gas-phase reaction with a best reaction performance in a fluidized-bed reactor.

For reducing the temperature fluctuation in the inside of the fluidized-bed, it is necessary to stably carry out the reaction while making reaction conditions constant as much as possible and to maintain the fluidized-bed in a good fluidization. It is generally known that the fluidizing condition greatly suffers from the effects of the gas-flowing rate and the particle size of the catalyst, but there is no particular restriction on the gas-flowing rate in the reactor according to the present invention, as long as the fluidizing condition of the fluidized-bed is kept satisfactory by the gas flowing rate.

Further, as the catalyst used for the fluidized-bed reactor in the present invention, any catalyst used in the usual fluidized-bed reactor can be used, and a catalyst having a weight-average particle diameter of from 30 to 100 μm, preferably, 40 to 80 μm, containing from 20 to 70% by weight of a fine particles with a particle diameter of not more than 44 μm, having a particle density of not more than 3,000 kg/m$^3$, and classified as group A of the Geldert's particle classification map (refer to Geldert, D., Powder Technology, 7, 285 (1973)), are preferred.

The fluidized-bed reactor according to the present invention is a large-sized fluidized-bed reactor used for carrying out, in an industrial scale, exothermic gas-phase reaction, for example, in the production of maleic anhydride by oxidative reaction of butane, butene, butadiene and benzene, in the production of phthalic anhydride by oxidative reaction of o-xylene and naphthalene, in the oxidative reaction such as an ammo-oxidation reaction of propylene, isobutylene and propane, and an oxychlorination reaction of ethylene. The fluidized-bed reactor according to the present invention is applied to a solid/gas fluidized-bed layer system for continuously carrying out a catalytic reaction, in which the fluidized state of a catalyst in the fluidized-bed is effective to aggregative fluidization, for example, of bubbling regime, slug flow regime, turbulent regime or the like, and it is generally referred to as a conventional fluidized-bed.

In the fluidized-bed reactor, catalyst particles are preferably maintained in fluidizing condition by a gas introduced from a lower portion of the reactor. The gas velocity is preferably maintained usually at 35 to 80 cm/sec on the basis of an effective cross sectional area of the reactor.

The temperature detection section is used for detecting the temperature of the fluidized-bed, which may be disposed only by one, but preferably, disposed in plurality such that the temperature of the entire fluidized-bed can be recognized correctly.

The heat-removing pipes are used for removing heat of the fluidized-bed and they are to be disposed in a plurality of rows. The heat-removing pipes are connected to coolant-feeding pipes and coolant-draining pipes at the outside of the reactor, and coolants are caused to flow from the coolant-feeding pipes by way of the heat-removing pipes to the coolant-draining pipes.

The feeding rate of the coolants to stationary heat-removing pipes to which the coolants are supplied at a stationary velocity can be calculated based on the total amount of heat to be removed by all the heat removal tubes and a ratio of the heat based thereon, to be removed by the stationary heat-removing pipes. The total amount of heat to be removed is mainly determined based on the amount of generated heat determined by the composition and the feeding rate of the reaction material supplied to the reactor, and the predetermined reaction temperature. Also, the total amount of heat to be removed is affected by the temperature of the reaction material and the amount of heat dissipated from the outer wall of the reactor to some extent depending on the case. Accordingly, unless such conditions are changed, the feeding rate of the coolants to the stationary heat-removing pipes is always maintained constant.

In the fluidized-bed reactor according to the present invention, there is no particular restriction on the amount of heat to be removed, and the total amount of heat to be removed by all the heat-removing pipes is appropriately within a range from 10,000 to 200,000 kcal/m²·hr. In addition, it is usually preferable to design such that a most portion of the amount of heat to be removed, preferably not less than 50%, more preferably not less than 80% thereof is removed by the stationary heat-removing pipes, and the remaining portion of the heat is removed by adjustable heat-removing pipes, to which the coolants are supplied at a variable velocity.

As the coolants to be supplied to the stationary heat-removing pipes, water or similar other liquid capable of removing heat by utilizing the latent heat of vaporization of coolants is used. By using such coolants, the entire heat transfer coefficient of the stationary heat-removing pipes can be increased so as to increase the amount of heat to be removed per unit surface area of the heat-removing pipes.

Water is preferably used as the coolants and at least a portion thereof is converted into steams in the pipes. The temperature of the water to be supplied is usually selected properly depending, for example, on reaction conditions. Usually, since the pressure of steams at the exit of the reactor is determined in accordance with the application uses of the steams, the temperature is preferably set within a range of a saturation temperature ±50° C., more preferably saturation temperature ±10° C. at an optional pressure. In the present invention, since it is efficient to use the steams at the exit as the coolants for the adjustable heat-removing pipes, the pressure of the steams at the exit of the stationary heat-removing pipes can be set usually to 5 to 50 kg/m². Accordingly, water heated to a range of a saturation temperature ±50° C., preferably the saturation temperature ±10° C. at the pressure is supplied as the coolants and 3 to 15%, preferably 5 to 10% thereof is vaporized in the stationary heat-removing pipes and recovered as a gas/liquid mixed phase flow at a high pressure from the exit.

In one embodiment of the present invention, the stationary heat-removing pipes preferably comprises not only vaporizing pipes which are supplied with water as the coolants to form steams but also two kinds of pipes composed of superheating pipes which are supplied with steams as the coolants to form superheated steams. With such a constitution the reaction heat of the fluidized-bed reactor can be recovered from the superheating pipes as dry steams convenient to use. It is advantageous also in this case that not less than 50%, preferably not less than 80% of the total amount of heat to be removed is removed by the heat-removing pipes which are supplied with water to generate steams.

The feeding rate of the coolants to the adjustable heat-removing pipes to which the coolants are supplied at a variable velocity is adjusted such that the temperature in the reactor is maintained to a predetermined level. That is, in accordance with a difference between the temperature detected by the temperature detection section disposed to the fluidized-bed and the temperature set to the reactor, the feeding rate of the coolants is determined so as to reduce the difference.

If the temperature in the reactor is different in the vertical direction of the fluidized-bed, it is preferred to dispose the adjustable heat-removing pipes and the temperature detection sections to the upper portion and the lower portion of the fluidized-bed, respectively, such that the temperature can be controlled independently in the upper portion and the lower portion of the fluidized-bed.

It is preferable in the adjustable heat-removing pipes not to cause phase change of the coolants such that the amount of heat to be removed and the coolant-flowing rate are substantially in proportion to each other, and the sensible heat of the coolants is utilized. The reason is as described below.

The heat removal amount Q in the heat-removing pipe is determined as the product of a heat transfer area A of the pipe, an entire heat transfer coefficient U and a logarithmic average temperature difference ΔT (the following formula (1)).

$$Q = A \cdot U \cdot \Delta T \tag{1}$$

Since the heat transfer area A of the heat-removing pipe is constant, it is necessary that at least one of the entire heat transfer coefficient U and the logarithmic average temperature difference ΔT be changed in order to change the heat removal amount Q. The entire heat transfer coefficient U is a function of an outer-pipe heat transfer coefficient ho, an inner-pipe heat transfer coefficient hi, a pipe thickness d, pipe thermal conductivity λ and fouling factor γ (the following formula (2)):

$$1/U = 1/ho + 1/hi + d/\lambda + \gamma \qquad (2)$$

The outer-pipe heat transfer coefficient ho is usually about 100 to 1000 kcal/m²·°C·hr, which can be regarded constant during temperature control of the reactor. In the same manner, since d, λ and γ can also be regarded constant, the entire heat transfer coefficient U changes, after all, in accordance with the change of the inner-pipe heat transfer coefficient hi. The inner-pipe heat transfer coefficient hi is determined depending on flow condition of the coolants in the pipe and it is about 100 to 1000 kcal/m²·°C·hr in the absence of the phase change of the coolants, whereas it is usually not less than 1000 kcal/m²·°C·hr in the presence of the phase change.

Accordingly, if the phase change of the coolants generates in the adjustable heat-removing pipe, the inner-pipe heat transfer coefficient hi is remarkably greater than the outer-pipe heat transfer coefficient ho, and as a result, since the entire heat transfer coefficient U does not change so much even if the flowing rate of the coolant is changed, control for the amount of heat to be removed is difficult by the adjustment of the coolant-flowing rate. In a case of using water as the coolants and if it is supplied at a high pressure and not vaporized in the pipe, the logarithmic average temperature difference ΔT can be changed easily within a wide range by changing the exit temperature, whereas if vaporization occurs in the pipe, the exit temperature is constant at a saturation temperature corresponding to the pressure. Accordingly, while the pressure has to be changed in order to change the exit temperature, control of the exit temperature by adjusting the pressure of the water to be supplied is extremely difficult although it is not impossible.

Accordingly, as the coolants for the adjustable heat-removing pipe, there can be mentioned a material not causing phase change in the pipes usually a gas, preferably steam. For instance, saturated steam at a pressure from 3 to 50 kg/m² are supplied and superheated steam is formed.

Further, the feeding rate of the coolants to the adjustable heat-removing pipe can be adjusted by, for example, a method of adjusting the exhaust velocity of the coolant-feeding device, a method of disposing a coolant-flowing control valve to the coolant-feeding pipes, or a method of disposing a coolant-flowing rate control valve to the coolant-draining pipes.

In a preferred embodiment according to the present invention, a bypass pipe is disposed between the coolant-feeding pipes and the coolant-draining pipes which are connected to the adjustable heat-removing pipe such that the coolants can be caused to flow directly from the coolant-feeding pipes to the coolant-draining pipes without by way of the adjustable heat-removing pipes, and further, a coolant-controlling valve is disposed for controlling the flowing rate of the coolants flowing through the bypass pipe.

Coolants are supplied at a constant rate to the coolant-feeding pipes connected with the adjustable heat-removing pipes, and a required amount of the coolants is caused to flow by the coolant-controlling valve to the adjustable heat-removing pipes while the remaining amount is caused to flow by way of the bypass pipe to the coolant-draining pipes. In this way, the coolant-feeding rate can be controlled rapidly and accurately. It may suffice that the bypass pipe can control the flowing rate of the coolants within such a range that the temperature of the coolants does not injure the material of the device. For instance, it may be set such that the optimum state can be attained at an opening degree of the coolant-controlling valve disposed to the bypass tube from 20 to 90%, preferably 30 to 60%.

A preferred embodiment of the present invention will be explained more specifically with reference to the drawings. FIG. 1 is a schematic view for one example of a fluidized-bed reactor, in which a fluidized-bed (2) comprising a catalyst is formed in a reactor (1). Air is supplied from an air-feeding pipe (3), while a hydrocarbon as a starting material is supplied from a hydrocarbon-feeding pipe (4) to the fluidized-bed. The feeding rate of the starting hydrocarbon is finely adjusted by a control valve (5). A gas containing a reaction product is drained by way of a reaction gas-draining pipe (6) out of the reactor (1).

In the reactor (1), are disposed a stationary heat-removing pipe (7) and a adjustable heat-removing pipe (8) being situated in the fluidized-bed (2) (although the stationary heat-removing pipe (7) and the adjustable heat-removing pipe (8) are illustrated each by one in the drawing, they are usually disposed each by a plurality of rows of pipes). Coolant-feeding pipes (9), (9') and coolant-draining pipes (10), (10') are connected, respectively, to the stationary heat-removing pipe (7) and the adjustable heat-removing pipe (8), such that the coolants flow as: coolant-feeding pipe—heat-removing pipe—coolant-draining pipe, so as to remove heat from the fluidized-bed (2). Further, a bypass pipe line (11) connecting the coolant-feeding pipe (9') and the coolant-draining pipe (10'), which are connected with the adjustable heat-removing pipe (8) is disposed out of the reactor (1), such that the coolants can flow from the coolant-feeding pipe (9') by way of the bypass pipe line (11) to the coolant-draining pipe (10'). A coolant-controlling valve (12) is disposed to the bypass pipe line (11) such that the flowing rate of the coolants flowing through the bypass pipe line can be adjusted.

Further, a temperature detection section (13) is disposed to the fluidized-bed (2) (although only one temperature detection sensor is illustrated in the drawing, there are usually disposed a plurality of sensors). The temperature information detected by the temperature detection section (13) is transmitted to a thermometer main body (14) and detected as a temperature of the fluidized-bed. The coolant-controlling valve (12) is operated based on the thus detected temperature, to adjust the amount of the coolants flowing into the adjustable heat-removing pipe (8). The temperature detection section (13), when disposed only by one, is usually disposed at a central portion of the fluidized-bed (2). Further, if a plurality of temperature detection sections (13) are disposed, a controlling temperature may be calculated as a function of the temperature detected by each of the temperature detection sections (13) and the coolant-controlling valve (12) may be operated based on the difference between the above-mentioned temperature and the set temperature. Further, the coolant-controlling valve (12) may be situated not to the bypass pipeline but situated, as a three-way valve, to a junction point for the coolant-feeding pipe (9') or the coolant-draining pipe (10'), the adjustable heat-removing pipe (8) and the bypass pipe (11).

EXAMPLE

The present invention will be explained more specifically with reference to examples but the present invention is not limited to the following examples.

Using a fluidized-bed reactor of 0.8 m in diameter as shown in FIG. 1, maleic anhydride was produced from butane. Vanadium/phosphorus-type composite oxide catalyst having an average particle diameter of 60 μm, containing 40% by weight of a fine powder of not more than 44 μm and having a particle density of 2880 kg/m³ was charged by 1500 kg in the reactor. In the fluidized-bed composed of the catalyst, are vertically disposed five rows of stationary heat-removing pipes (7) each of 60.5 mm in outer diameter and 4 m in length and a row of a adjustable heat-removing pipe (8) of 60.5 mm in outer diameter and 4 m in length. The coolant-feeding pipes (9, 9') and the coolant-draining pipes (10, 10') are connected to the heat-removing pipes respectively. The bypass pipe (11) having a coolant-controlling valve (12) at the midway is disposed between the coolant-feeding pipe (9') and the coolant-draining pipe (10') which are connected to the adjustable heat-removing pipe (8). The temperature detection section (13) is disposed to a central portion of the fluidized-bed.

Air was supplied from the starting material air-feeding pipe (3) at a constant flowing rate of 1,000 Nm³/hr as an amount of dry air, while n-butane was supplied at about 42 Nm³/hr from the starting hydrocarbon-feeding pipe (4), respectively, to the reactor.

Water at 185° C. was supplied to the stationary heat-removing pipe (7), in which 5–10% thereof was vaporized in the pipe and then recovered from the exit as a gas-liquid mixed flow at 194° C., 13 kg/cm²G.

Saturated steam at 194° C., 13 kg/cm²G were supplied to the adjustable heat-removing pipe (8) at 50% opening degree of the coolant-controlling valve (12) and recovered as superheated steam at 250° C. from the exit. The temperature of the fluidized-bed was set to 452.5° C.

It was set such that 85% of the initial heat removal amount was removed by the stationary heat-removing pipe (7), while the remaining portion thereof was removed by the adjustable heat-removing pipe (8).

For initial four days, the feeding rate of n-butane was finely adjusted by operating the control valve for the starting hydrocarbon-feeding pipe in accordance with the temperature detected by the temperature detection section (13) without operating the coolant-controlling valve (12), to set the temperature of the fluidized-bed constant. Successively, for five days from the fifth day, n-butane was supplied at a constant velocity of 42 Nm³/hr, and the feeding rate of saturated steam to the adjustable heat-removing pipe was finely controlled by operating the coolant-controlling valve (12) within a range of opening degree from 30 to 60% in accordance with the temperature detected by the temperature detection section (13) to make the temperature of the fluidized-bed constant.

Figure 2:
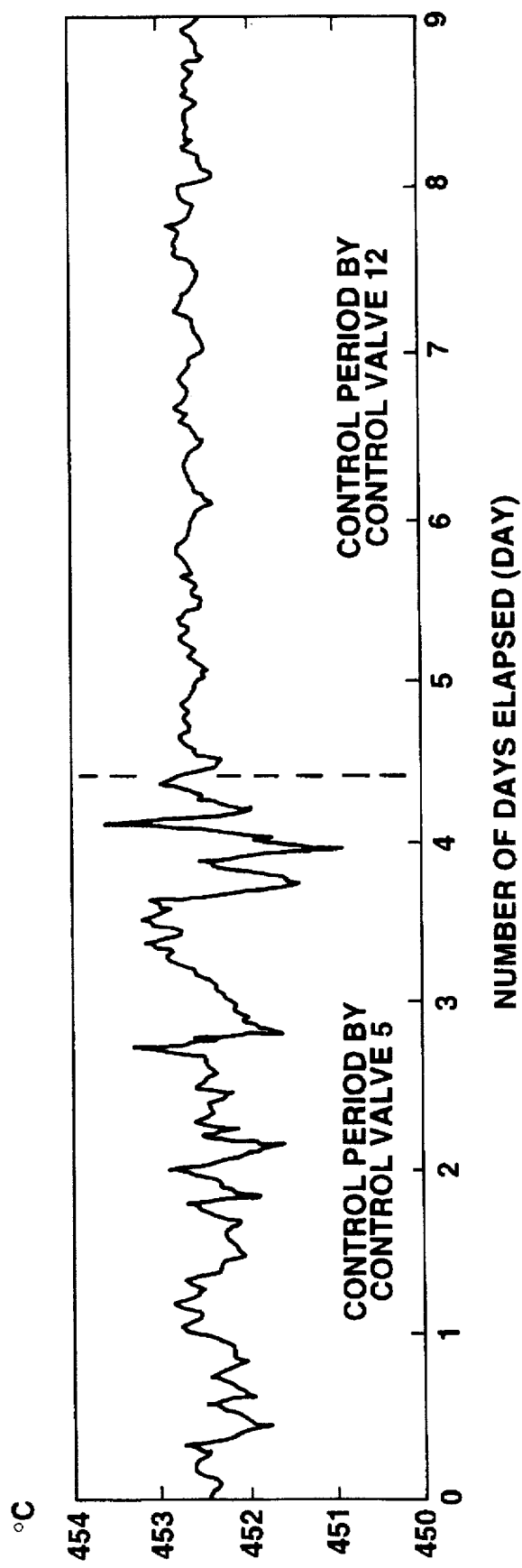
FIG. 2 is a view illustrating the change of a reaction temperature in a preferred embodiment.
Figure 3:
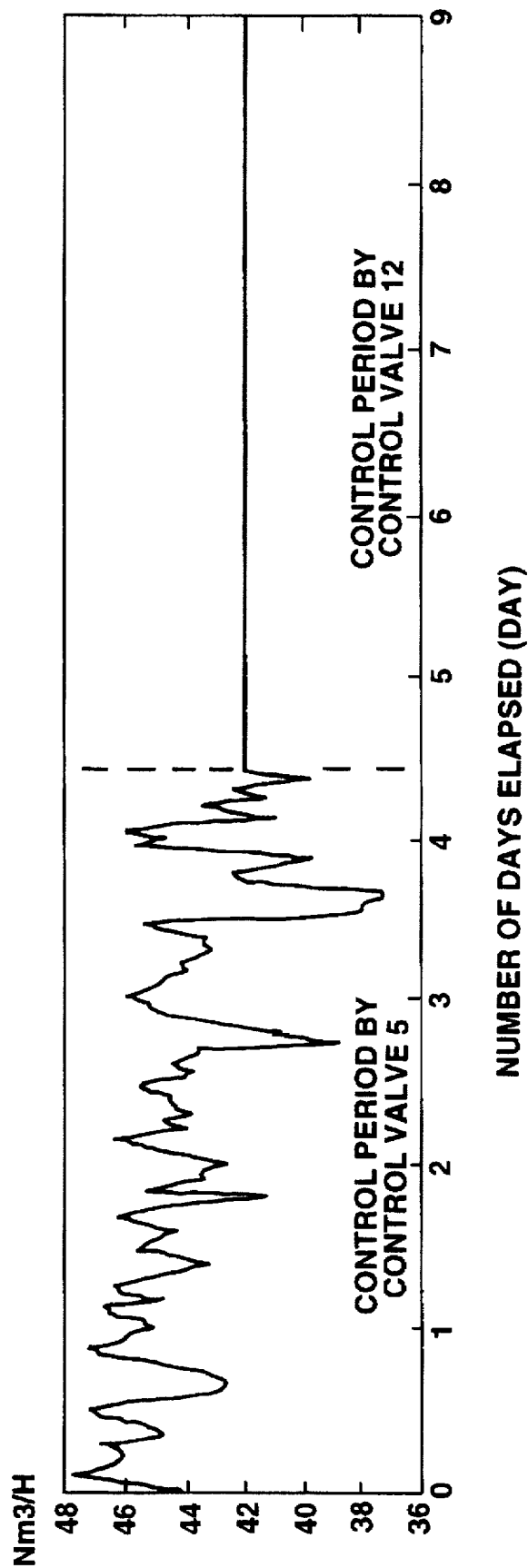
FIG. 3 is a view illustrating the change of a feeding rate of n-butane in the preferred embodiment.

FIG. 2 shows the temperature of the fluidized-bed, while FIG. 3 shows the feeding rate of n-butane, for nine days.

It can be seen from FIG. 2 that the temperature is controlled in accordance with the present invention within a range of ±0.5 relative to the temperature of 452.5° C. set to the fluidized-bed.

INDUSTRIAL APPLICABILITY

According to the present invention, the temperature of the fluidized-bed reactor can be controlled extremely accurately. While the reaction is taken place in fluidized-bed reaction usually above 200° C., the range for the temperature change can be confined within ±0.5° C., also in a case of a temperature set about at 450° C. in accordance with the present invention, so that stable operation is possible for a long period of time near the highest yield point within a wide reaction temperature range.

Further, since most of the amount of heat to be removed is shared by the stationary heat-removing pipe while the adjustable heat-removing pipe can be operated only with an aim of adjusting the amount of heat to be removed, it can accurately follow after even minute fluctuation of required amount of heat to be removed.

What is claimed is:

1. A temperature-controlling method for a fluidized-bed reactor for conducting an exothermic gas phase reaction for obtaining malic anhydride from butane in the fluidized-bed reactor, the fluidized-bed reactor having a plurality of heat-removing pipes disposed in the fluidized-bed, the method comprising:

supplying a first coolant at a stationary velocity to at least one of the heat removing pipes, simultaneously supplying a second coolant at a variable velocity to at least one of the other heat-removing pipes, the second coolant being a gas, removing not less than 50% of the total amount of heat to be removed utilizing the latent heat of vaporization of the first coolant, feeding the second coolant at the variable velocity depending on a temperature detected by a temperature detection section in the fluidized-bed, providing a catalyst having a weight-average particle diameter of from 30 to 100 μm, containing 20 to 70% by weight of a fine powder with a particle diameter of not more than 44 μm and having a particle density of not more than 3000 kg/m³, and fluidizing the catalyst by introducing a gas from a lower portion of the fluidized-bed reactor.

2. A temperature-controlling method for a fluidized-bed reactor as defined in claim 1, wherein water is supplied as the coolants to the heat-removing pipe to which the coolants are supplied at the stationary velocity.

3. The temperature controlling method for a fluidized-bed reactor as defined in claim 1 wherein water is supplied as the first coolant.

4. A temperature-controlling method for a fluidized-bed reactor as defined in claim 1, wherein the first coolant is heated water.

5. The temperature controlling method for a fluidized-bed reactor as defined in claim 1 wherein the second coolant is steam.

6. A temperature-controlling method as defined in claim 1, wherein the amount of heat to be removed in the heat-removing pipe to which the first coolant is supplied at the stationary velocity is not less than 80% of the total amount of heat to be removed.

7. A temperature-controlling method as defined in claim 1, wherein the feeding rate of the reaction material to the fluidized-bed reactor is maintained within a constant range.

8. A temperature-controlling method as defined in claim 1, wherein the total amount of heat to be removed is from 10,000 to 200,000 kcal/m².

9. A temperature-controlling method for a fluidized-bed reactor as defined in claim 1, wherein the gas velocity for maintaining the catalyst in the fluidizing condition is maintained at 35 to 80 cm/sec based on the effective cross sectional area of the reactor.

10. The temperature controlling method as defined in claim 1 further comprising controlling the feeding velocity of the second coolant to the heat removal pipe by bypassing a controlled portion of the second coolant through a bypass pipe connecting coolant supply pipes and coolant draining pipes.

11. The temperature control method of claim 10 further comprising providing a control valve for controlling the portion of the second coolant which bypasses the heat removal pipe.

* * * * *